US012049092B2

(12) United States Patent

Luu et al.

(10) Patent No.: US 12,049,092 B2

(45) Date of Patent: Jul. 30, 2024

(54) DROP-ON-DEMAND IDENTIFICATION DOCUMENT PRINTING WITH IMPROVED PRINT ADHESION

(71) Applicant: Entrust Corporation, Shakopee, MN (US)

(72) Inventors: Andrew Luu, Shakopee, MN (US); Jon Wawra, Shakopee, MN (US); Brendan Hinnenkamp, Shakopee, MN (US); Utpal Vaidya, Shakopee, MN (US)

(73) Assignee: Entrust Corporation, Shakopee, MN (US)

( * ) Notice: Subject to any disclaimer, the term of this patent is extended or adjusted under 35 U.S.C. 154(b) by 0 days.

(21) Appl. No.: 17/712,539

(22) Filed: Apr. 4, 2022

(65) Prior Publication Data

US 2022/0314674 A1 Oct. 6, 2022

Related U.S. Application Data

(60) Provisional application No. 63/170,654, filed on Apr. 5, 2021.

(51) Int. Cl.

*B41M 7/00* (2006.01)
*B41M 1/30* (2006.01)
*B41M 5/00* (2006.01)

(52) U.S. Cl.

CPC ............ *B41M 1/30* (2013.01); *B41M 5/0011* (2013.01); *B41M 5/0047* (2013.01); *B41M 5/0064* (2013.01); *B41M 7/0045* (2013.01); *B41M 7/0072* (2013.01); *B41M 7/0081* (2013.01)

(58) Field of Classification Search

CPC .... B41M 1/30; B41M 5/0011; B41M 5/0047; B41M 5/0064; B41M 7/0045; B41M 7/0072; B41M 7/0081

See application file for complete search history.

(56) References Cited

U.S. PATENT DOCUMENTS 4,825,054 A 4/1989 Rust et al.
4,995,501 A 2/1991 Undstrom et al.
5,266,781 A 11/1993 Warwick et al.
5,837,991 A 11/1998 LaManna et al.

(Continued)

FOREIGN PATENT DOCUMENTS

CN 110691700 A * 1/2020 ........ B41J 11/00214
JP 2013-129123 A 7/2013

(Continued)

OTHER PUBLICATIONS

International Search Report and Written Opinion, International Patent Application No. PCT/IB2022/053123, Jun. 30, 2022 (11 pages).

*Primary Examiner* — Yaovi M Ameh

(74) *Attorney, Agent, or Firm* — Merchant & Gould P.C.

(57) ABSTRACT

A plastic card personalization system with a drop-on-demand plastic card print station that prints radiation curable material, a plasma treatment station, and a radiation curing station. By using a combination of controlling plasma treatment conditions on the surface of the plastic card prior to DOD printing together with controlling the dwell time of the printed material applied to the plastic card prior to full curing of the printed material, a surprising and unexpected improvement of the adhesion of the printed material to the plastic card is achieved.

12 Claims, 4 Drawing Sheets

(56) References Cited

U.S. PATENT DOCUMENTS

| | | | |
|---|---|---|---|
| 6,131,817 | A | 10/2000 | Miller |
| 6,695,205 | B1 | 2/2004 | Lundstrom et al. |
| 6,783,067 | B2 | 8/2004 | Kreuter et al. |
| 6,902,107 | B2 | 6/2005 | Shay et al. |
| 7,398,972 | B2 | 7/2008 | Schuller et al. |
| 7,434,728 | B2 | 10/2008 | Paulson et al. |
| 10,576,769 | B2 | 3/2020 | Wooldridge |
| 10,668,748 | B2 | 6/2020 | Wooldridge et al. |
| 2007/0157836 | A1* | 7/2007 | Schmitt .................... B41J 3/407 101/425 |
| 2013/0050369 | A1 | 2/2013 | Tojo |
| 2013/0220984 | A1 | 8/2013 | Cronin et al. |
| 2018/0257416 | A1* | 9/2018 | Wooldridge ......... B41M 5/0047 |
| 2018/0326763 | A1 | 11/2018 | Wooldridge et al. |
| 2021/0086530 | A1 | 3/2021 | Hinnenkamp |

FOREIGN PATENT DOCUMENTS

| | | | | |
|---|---|---|---|---|
| KR | 10-2021-0020471 | A | 2/2021 | |
| WO | WO-2012093395 | A2 * | 7/2012 | ............. D21C 5/025 |

* cited by examiner

DROP-ON-DEMAND IDENTIFICATION DOCUMENT PRINTING WITH IMPROVED PRINT ADHESION

FIELD

This technical disclosure relates to drop-on-demand (DOD) printing on plastic identification documents such as plastic cards including, but not limited to, identification cards, driver's licenses, financial cards including credit and debit cards, and other plastic cards, as well as passport pages.

BACKGROUND

The use of DOD printing to print images, patterns and text on plastic identification documents is known. In the case of plastic cards, to improve the adhesion of the printed material to the surface of the plastic card, the printed material applied to the card surface by the DOD printer may be designed to be cured using radiation, such as ultraviolet radiation, after the printed material is applied to the card surface. In addition, it is known to plasma treat the card surface prior to DOD printing which can further enhance the adhesion of the resulting printing to the card surface.

SUMMARY

Techniques are described herein for improving the adhesion of printed material to plastic identification documents, such as plastic cards and passport pages, where the printed material is applied by a DOD printer. By using a combination of controlling plasma treatment conditions on the surface of the plastic identification document prior to DOD printing together with controlling the dwell time of the printed material applied to the plastic identification document surface prior to full curing of the printed material, a surprising and unexpected improvement of the adhesion of the printed material to the plastic identification document surface is achieved.

In an embodiment, the plastic identification document can be a polycarbonate card or a polyester card, or a polycarbonate page, such as the datapage, of a passport. At least the surface or layer of the plastic identification document to which the printed material is applied by the DOD printer can be polycarbonate or polyester. Alternatively, all or substantially all of the plastic identification document can be formed by polycarbonate or polyester. The plastic identification document is of a type that includes an image (often termed a portrait image) of the card holder or of the passport holder (i.e. the intended holder of the plastic card or the intended holder of the passport). The image may be a multi-color image of the card holder or the passport holder. The plastic card may be an identification card, a driver's license, a financial card including a credit and debit card, and other plastic cards.

The printed material that is printed by the DOD printer can be any material that is curable by the application of radiation, for example ultra-violet (UV) radiation), to the printed material after it is applied to the surface of the identification document. Examples of materials that can be printed by a DOD printer include, but are not limited to, ink, varnish and any other radiation curable materials that can be applied to plastic identification documents by the DOD printer.

The DOD printer is incorporated into an identification document personalization system (i.e. in the case of plastic cards, termed a plastic card personalization system; in the case of a plastic passport page, termed a passport personalization system). The personalization system includes at least the DOD printer, a plasma treatment station that plasma treats a surface of the identification document prior to the DOD printing, and a radiation curing station. The personalization system can also include an input that can hold multiple documents and input the documents one-by-one for processing in the system, an output that can hold multiple documents after being processed, and additional document processing stations.

In an embodiment, the personalization system can separately and independently control what will be referred to as plasma treatment speed and cure delay. Plasma treatment speed refers to the relative movement speed between the plasma treatment mechanism of the plasma treatment station and the identification document during plasma treatment. The identification document may move relative to the plasma treatment mechanism which can be fixed in position and stationary during plasma treatment, the identification document may be fixed and stationary during plasma treatment while the plasma treatment mechanism moves relative to the identification document, or both the identification document and the plasma treatment mechanism may move during plasma treatment.

Cure delay refers to the time between the completion of the DOD printing using the radiation curable material and subsequent full or complete curing of the applied radiation curable material in the radiation curing station. Any technique, or combinations of techniques, for controlling movement of the identification document after completion of the DOD printing so that complete curing of the radiation curable material by the curing station occurs upon completion of the cure delay can be utilized. The cure delay can be achieved by, for example, slowing down the transport of the identification document from the DOD printer to the curing station so that the identification document arrives at the curing station at the end of the cure delay period ready to be fully cured. Another way to achieve the desired cure delay is to "park" the identification document (i.e. stop movement of the identification document) for a period of time after DOD printing. For example, after DOD printing, the identification document can be immediately transported to the curing station and parked there to complete the cure delay upon which the radiation curable material is fully cured. Alternatively, after DOD printing, the identification document can be parked in an intermediate hopper located between the DOD printer and the curing station, parked in the transport path between the DOD printer and the curing station, or even parked in the DOD printer. In an embodiment, during the cure delay the radiation curable material that is applied during the DOD printing can be partially cured with a low dose of radiation immediately after printing to prevent unintended migration of the printed radiation curable material on the card surface, followed by full or complete curing after the cure delay is complete.

DRAWINGS

FIG. 1 schematically illustrates a plastic identification document or plastic card personalization system described herein.

FIG. 2 schematically illustrates another embodiment of a plastic identification document or plastic card personalization system described herein.

DETAILED DESCRIPTION

A DOD printing process is described that results in improved adhesion of printed material to plastic identification documents, such as plastic cards and passport pages. The printed material is curable by radiation and is applied by a DOD printer. By using a combination of controlling plasma treatment conditions on the surface of the plastic identification document prior to DOD printing together with controlling the dwell time (also referred to as cure delay) of the radiation curable material applied to the plastic identification document surface prior to full curing of the printed material, an improvement in the adhesion of the printed material to the plastic identification document surface is achieved. In addition, plasma treatment can also effect card wettability with the radiation curable material, which in turn can influence print quality. Therefore, in an embodiment, the plasma treatment speed and the cure delay can be selected such that desired card wettability can be achieved in addition to improved adhesion of the printed material.

The plastic identification document can be a polycarbonate card or a polyester card, or a polycarbonate page, such as the datapage, of a passport. For sake of convenience, the plastic identification document will hereinafter be described as a plastic card. At least the surface or layer of the plastic card to which the printed material is applied by the DOD printer can be polycarbonate or polyester. Alternatively, all or substantially all of the plastic card can be formed by polycarbonate or polyester. The plastic card is of a type that includes an image (often termed a portrait image) of the card holder (i.e. the intended holder of the plastic card). The image may be a multi-color image of the card holder. The plastic card may be an identification card, a driver's license, a financial card including a credit and debit card, and other plastic cards bearing an image of the card holder.

The printing by the DOD printer can be multi-color or single color. The DOD printing can form a portrait image, text, graphics, a barcode and combinations thereof. The DOD printing may be used in combination with other printing techniques, such as laser marking, thermal printing or retransfer printing. The DOD printing may be combined or overlapped with another print technique, such as laser marking, to obtain a special printed feature. For example, a multi-color or full color image may be produced using a combination of the DOD printing and laser marking.

Figure 1:
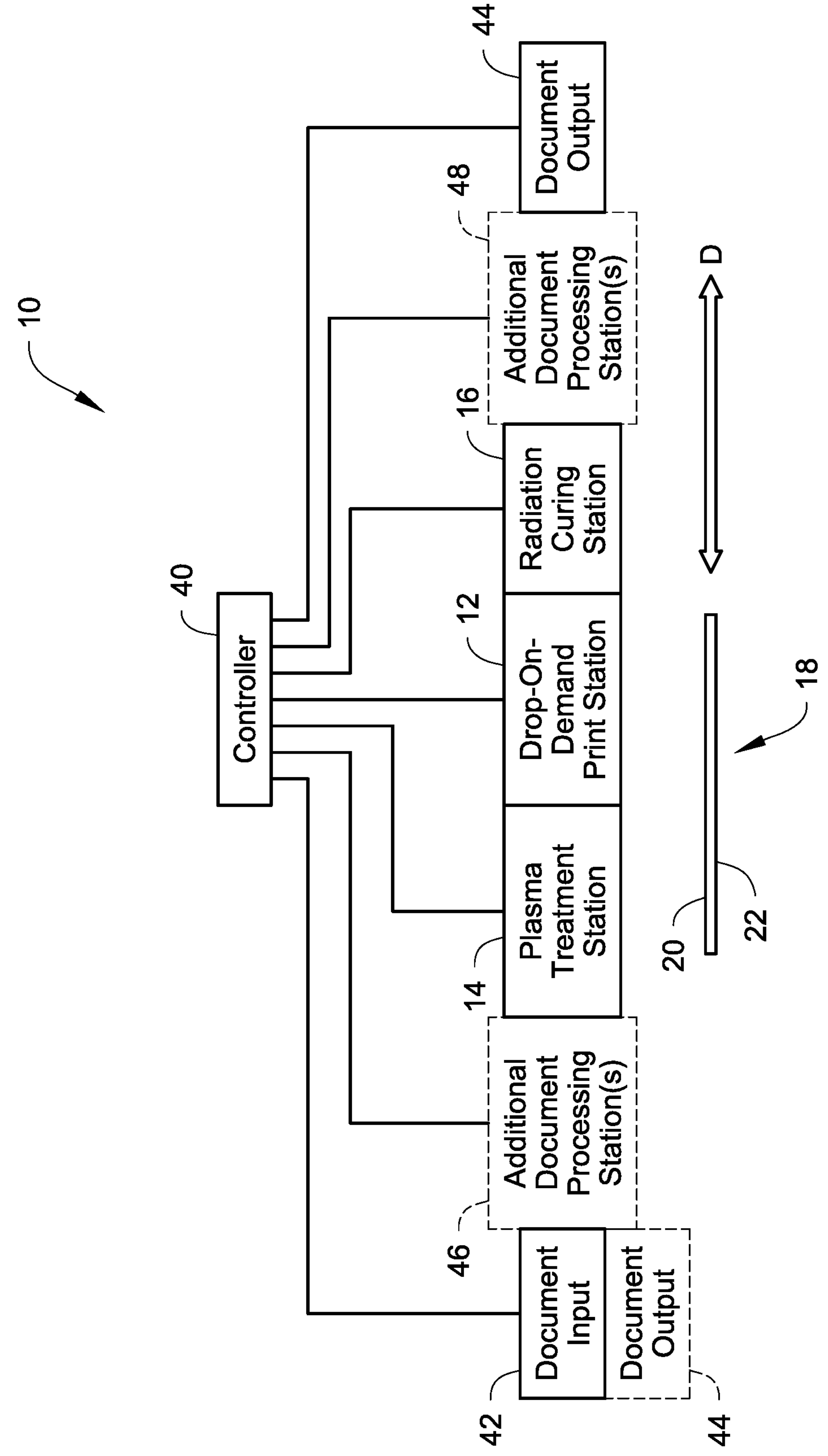

Referring to FIG. 1, a plastic card personalization system 10 that can implement a DOD printing process described herein is illustrated. The system 10 includes at least a DOD print station 12, a plasma treatment station 14 and a radiation curing station 16. The system 10 is configured to personalize a plastic card 18. During personalization, the plastic card 18 generally travels in the direction of the arrow D along a card travel path which may be linear. Transport of the plastic card 18 along the card travel path is achieved using suitable transport mechanisms known in the art including rollers, belts, tabbed belts, and combinations thereof. The transport mechanisms may be configured to transport the plastic card 18 in a single, forward direction, or the transport mechanisms may be reversible to transport the plastic card 18 in forward and reverse directions. Card transport mechanisms are well known in the art including those disclosed in U.S. Pat. Nos. 6,902,107, 5,837,991, 6,131,817, and 4,995,501 and U.S. Published Application Nos. 2013/0220984 and 2018/0326763, each of which is incorporated herein by reference in its entirety. A person of ordinary skill in the art would readily understand the type(s) of card transport mechanisms that could be used, as well as the construction and operation of such card transport mechanisms.

Figure 4:
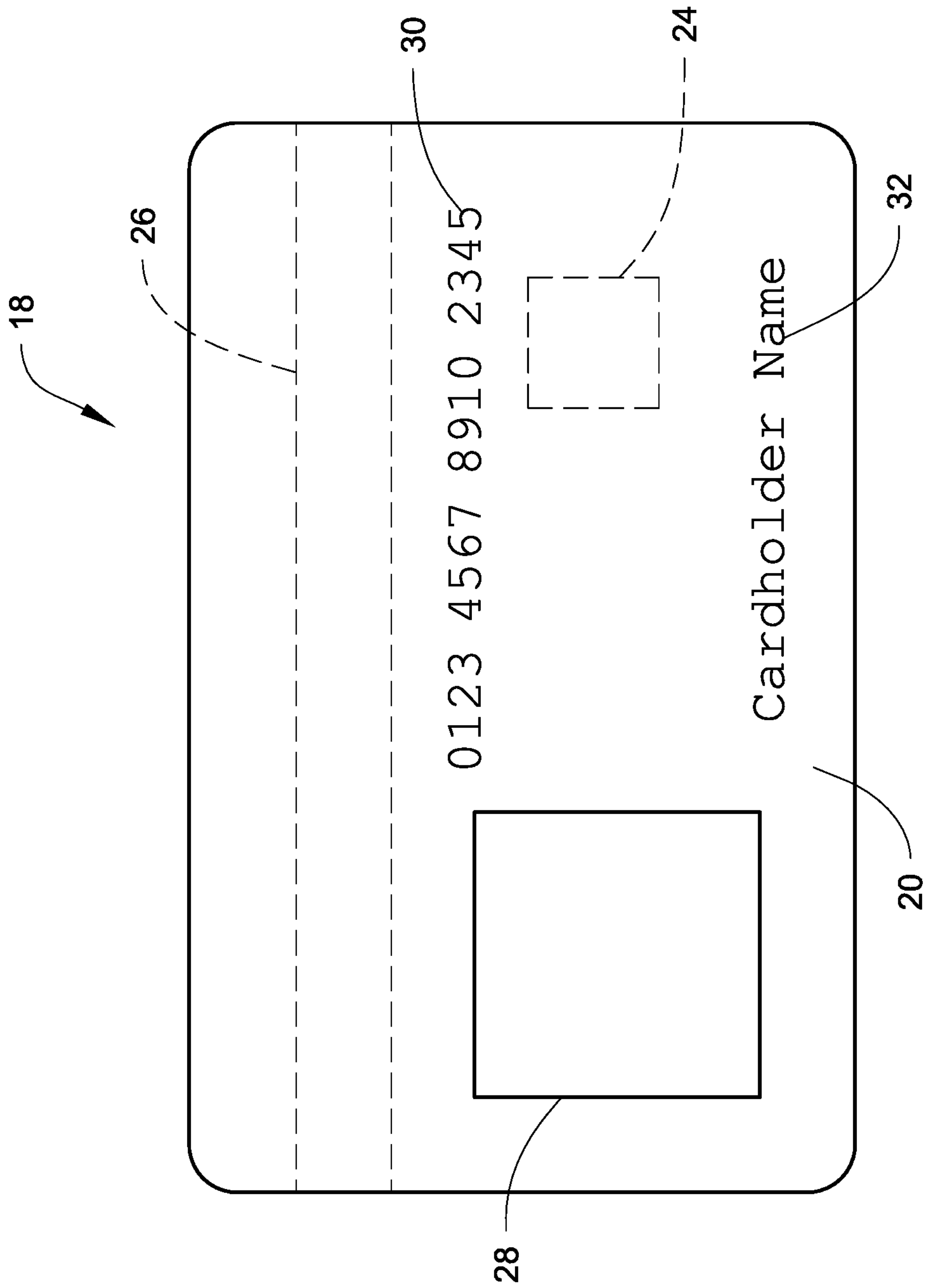
FIG. 4 illustrates an example of a plastic card that can be printed as described herein.

FIG. 4 illustrates an example of the plastic card 18. In this example, the card 18 is shown to include a front surface 20 and a rear or back surface 22 (best seen in FIG. 1) opposite the front surface 20. The card 18 can include an optional integrated circuit chip 24 and/or an optional magnetic stripe 26. The front surface 20 (or the rear surface 22) can include a printed image (i.e. a portrait image) 28 of the intended card holder. The printed image 28 is printed by the print station 12 (FIG. 1) and can be a multicolor image for example printed from cyan, magenta, yellow and black (CMYK) inks. The card 18 can further include additional personal data provided on the front surface 20 or on the rear surface 22 such as a personal account number 30, a CVV number (not shown), and the name of the cardholder 32. The additional personal data may be printed onto the card 18 using the print station 12 and/or using other known printing techniques, for example direct to card thermal printing, retransfer printing, laser marking, and other printing techniques known in the art of plastic card processing.

Returning to FIG. 1, the print station 12 can be a conventional DOD print station known in the art that includes a plurality of DOD printheads, one printhead for each ink color and other material, such as varnish, to be printed. The inks and other materials printed by the print station 12 are curable by radiation, such as ultraviolet (UV) radiation, after being applied to the card 18. The print station 12 further includes its own print station card transport mechanism (i.e. the transport mechanisms is physically separate from and can be controlled separately from transport mechanisms of the plasma treatment station 14 and the radiation curing station 16) for transporting the card 18 along the card transport path within the print station 12. The card transport mechanism of the print station 12 may be reversible to permit transport of the card 18 in forward and reverse directions in the print station 12. Operation of the print station 12 can be controlled by a suitable controller 40 which can control the entire system 10, or the print station 12 can have its own dedicated controller. A DOD printing mechanism that can be utilized is the DOD printing module available from Entrust Corporation of Shakopee, Minnesota.

With continued reference to FIG. 1, the plasma treatment station 14 is positioned in the system 10 so as to be able to plasma treat the surface of the plastic card 18 prior to DOD printing. For example, the plasma treatment station 14 can be located upstream of the print station 12. The plasma treatment station 14 includes its own card transport mechanism (i.e. the transport mechanism is physically separate from and can be controlled separately from transport mechanisms of the print station 12 and the radiation curing station 16) for transporting the card 18 along the card transport path within the station 14. The card transport mechanism of the station 14 may be reversible to permit transport of the card 18 in forward and reverse directions in the station 14. The station 14 is configured to move a plasma treatment nozzle and the card 18 relative to one another during plasma treatment of the card surface. In one embodiment, the card 18 is held stationary during plasma treatment while the plasma nozzle is moved relative to the card 18, with the card transport mechanism of the station 14 moving the card into treatment position and transporting the card 18 from the station 14 after treatment. In another embodiment, the plasma nozzle is stationary while the card 18 is moved relative to the plasma nozzle during plasma treatment. The plasma nozzle of the station 14 may be configured to treat only a portion of the card surface in a single pass of the card 18 and the nozzle relative to one another, or the plasma nozzle may be configured to treat the entire card surface in a single pass of the card 18 and the nozzle relative to one another. Operation of the station 14 can be controlled by the controller 40, or the station 14 can have its own dedicated controller. A plasma treatment station that can be utilized is described in U.S. Pat. No. 10,576,769, the entire contents of which are incorporated herein by reference.

With continued reference to FIG. 1, the radiation curing station 16 is positioned in the system 10 so as to be able to apply radiation to radiation curable material that is applied to the surface of the plastic card 18 by the DOD print station 12 to fully cure the radiation curable material. For example, the radiation curing station 16 can be located downstream of the print station 12. The radiation curing station 16 includes its own card transport mechanism (i.e. the transport mechanism is physically separate from and can be controlled separately from transport mechanisms of the print station 12 and the plasma treatment station 14) for transporting the card 18 along the card transport path within the station 16. The card transport mechanism of the station 16 may be reversible to permit transport of the card 18 in forward and reverse directions in the station 16. The station 16 is configured with one or more devices to emit radiation to cure the radiation curable material. The device(s) may be one or more light emitting diodes, and the radiation may be UV radiation. The card 18 and the radiation emitting device(s) are controlled to move relative to one another during curing of the radiation curable material. In one embodiment, the card 18 is moved, for example by the transport mechanism of the station 16, relative to the radiation emitting device(s) during curing. In another embodiment, the card 18 can be held stationary while the radiation emitting device(s) is moved relative to the card 18 during curing. The radiation emitting device(s) may be configured to apply radiation to the entire card surface in a single pass of the card 18 and the radiation emitting device(s) relative to one another, or apply radiation only to portions of the card surface containing radiation curable material. In another embodiment, some or all of the card surface may be exposed to radiation while both the card 18 and the radiation emitting device are stationary. Operation of the station 16 can be controlled by the controller 40, or the station 16 can have its own dedicated controller. A radiation curing station that can be utilized is described in U.S. 2021/0086530, the entire contents of which are incorporated herein by reference, or available from Entrust Corporation of Shakopee, Minnesota.

The system 10 can also include a card input 42 and a card output 44. The card input 42 is configured to hold a plurality of plastic cards waiting to be processed and to input each card one-by-one for subsequent processing. The card output 44 is configured to receive a hold a plurality of the cards 18 after processing has been completed. The input 42 and the output 44 can be positioned in the system at any locations suitable for performing their input and output functions. For example, for example, the input 42 can be located at the front end of the system 10 while the output 44 can be located at the tail end of the system 10 as shown in FIG. 1. Alternatively, both the input 42 and the output 44 can be located at the front end of the system 10. Other locations of the input 42 and the output 44 in the system 10 are possible.

The system 10 may also include optional additional card processing station(s) 46 between the card input 42 and the plasma treatment station 14 and/or optional additional card processing station(s) 48 between the radiation curing station 16 and the card output 44. The optional additional card processing station(s) 46, 48 can be plastic card processing stations known in the art to perform plastic card processing operations that are known in the art. For example, the optional additional card processing stations can include a magnetic stripe read/write system that is configured to read data from and/or write data to the magnetic stripe on the card, and/or an integrated circuit chip programming system that is configured to program the integrated circuit chip on the card. Magnetic stripe read/write systems and integrated circuit chip programming systems are disclosed, for example, in U.S. Pat. Nos. 6,902,107 and 6,695,205 the entire contents of which are incorporated herein by reference, and can be found in the MX family of central issuance systems available from Entrust Corporation of Shakopee, Minnesota. The optional additional card processing station(s) 46, 48 can also be configured to perform one or more of embossing; indenting; laminating; laser marking; apply a topcoat; a quality control station that is configured to check the quality of personalization/processing applied to the cards; a security station that is configured to apply a security feature such as a holographic foil patch to the cards; and other card processing operations.

In an embodiment, the additional card processing stations 46 (or the additional card processing stations 48) can include a laser marking station that includes a laser used to produce a laser marking on the card 18. Applicant has discovered that the laser marking station can be used together with the plasma treatment station 14, the DOD print station 12 and the radiation curing station 16 without slowing down the card throughput (i.e. the number of cards processed per unit of time) of the laser marking station.

The personalization system 10 is configured to separately and independently control what will be referred to as the plasma treatment speed of the plasma treatment station 14 and cure delay. The plasma treatment speed refers to the relative movement speed between the plasma treatment nozzle(s) of the plasma treatment station 14 and the card 18 during plasma treatment in the plasma treatment station 14. Cure delay refers to the time between the completion of the DOD printing of the radiation curable material by the DOD print station 12 and subsequent full or complete curing of the applied radiation curable material in the radiation curing station 16. Any technique, or combinations of techniques, for controlling movement of the card 18 after completion of the DOD printing so that complete curing of the radiation curable material by the curing station 16 occurs upon completion of the cure delay can be utilized. The cure delay can be achieved by, for example, slowing down the transport of the card from the DOD print station 12 to the curing station 16 so that the card 18 arrives at the curing station 16 at the end of the cure delay period ready to be fully cured. Another way to achieve the desired cure delay is to "park" the card 18 (i.e. stop movement of the card 18) for a period of time after DOD printing. For example, after DOD printing, the card 18 can be immediately transported to the curing station 16 and parked there to complete the cure delay upon which the radiation curable material is fully cured. Alternatively, after DOD printing, the card 18 can be parked in an intermediate hopper located between the DOD print station 12 and the curing station 16, parked in the transport path between the DOD print station 12 and the curing station 16, or even parked in the DOD print station 12. An example of implementing card transport delay between printing of a radiation curable material and subsequent curing is disclosed in U.S. Pat. No. 10,668,748 the entire contents of which are incorporated herein by reference.

In conventional processing of plastic cards by a plasma treatment station, the plasma treatment speed (i.e. the relative speed between the plastic card and the plasma nozzle(s) during treatment) is around 50 inches per second. Likewise, in conventional processing of plastic cards, the cure delay is around 1650 ms (i.e. 1.65 seconds).

Applicant has discovered that together plasma treatment speed and cure delay significantly impact adhesion of the printed material to the plastic card, and that improved adhesion of the printed material to the plastic card, in particular polycarbonate cards and polyester cards, can be achieved using a specific combination of plasma treatment speed and cure delay time. Although plasma treatment speed and cure delay are believed to be the primary factors impacting adhesion, additional factors that may be relevant to adhesion include, but are not limited to, the distance between the card surface and the plasma treatment nozzle(s), the shape of the plasma stream emitted from the plasma nozzle(s) (i.e. cone-shaped plasma stream or oval-shaped plasma stream), and pinning of the applied radiation curable material. Pinning refers to a partial curing of the radiation curable material during or prior to the cure delay and prior to full curing in the radiation curing station. Pinning can be achieved using a pinning station for example located between the DOD print station and the radiation curing station. An example of pinning of a radiation curable material is described in U.S. 2021/0086530.

The following Table 1 illustrates the results of a number of tests on polycarbonate plastic cards on which the same printed portrait image has been printed as described herein including plasma treatment followed by printing in the DOD print station followed by curing in the radiation curing station. Applicant believes that similar results would be achieved for polyester cards. The cards were tested using an adhesion crosshatch tape test based on InterNational Committee for Information Technology Standards (INCITS) 322:2015, Card Durability Test Methods, Section 5.2. The cards were also aged 4 days at 50° C. at 95% humidity according to INCITS 322:2015, Card Durability Test Methods, Section 5.7. The results column in Table 1 indicates the number of squares remaining from a 5×5 grid of 2 mm squares after the adhesion crosshatch tape test.

TABLE 1

Testing results of polycarbonate plastic cards

| Card | Plasma Treatment Speed (in/sec) | Cure Delay Time (ms) | Plasma output shape | Nozzle distance from card surface (mm) | Pinning power (on a scale of 0-255) | Results |
|---|---|---|---|---|---|---|
| 1 | 10 | 3000 | Oblong | 2.5 | 10 | 15.0 |
| 2 | 25 | 3000 | Oblong | 5.0 | 10 | 15.5 |
| 3 | 25 | 1500 | Cone | 2.5 | 0 | 12.5 |
| 4 | 25 | 1500 | Oblong | 2.5 | 10 | 14.0 |
| 5 | 10 | 1500 | Cone | 2.5 | 10 | 22.0 |
| 6 | 10 | 1500 | Oblong | 5.0 | 10 | 24.5 |
| 7 | 25 | 3000 | Oblong | 2.5 | 0 | 13.0 |
| 8 | 10 | 1500 | Cone | 5.0 | 0 | 25.0 |
| 9 | 10 | 3000 | Cone | 5.0 | 10 | 22.0 |
| 10 | 25 | 3000 | Cone | 5.0 | 0 | 23.0 |
| 11 | 10 | 1500 | Oblong | 2.5 | 0 | 11.5 |
| 12 | 10 | 3000 | Oblong | 5.0 | 0 | 25.0 |
| 13 | 25 | 1500 | Cone | 5.0 | 10 | 12.5 |
| 14 | 25 | 3000 | Cone | 2.5 | 10 | 23.5 |
| 15 | 25 | 1500 | Oblong | 5.0 | 0 | 15.5 |
| 16 | 10 | 3000 | Cone | 2.5 | 0 | 23.0 |

In one embodiment, the plasma treatment speed can be between about 10 in/sec to about 50 in/sec and the cure delay can be between about 500 ms to about 10000 ms. In another embodiment, the plasma treatment speed can be between about 10 in/sec to about 25 in/sec and the cure delay can be between about 1500 ms to about 3000 ms. In another embodiment, the plasma treatment speed can be about 10 in/sec and the cure delay can be between about 1500 ms to about 3000 ms. In still another embodiment, the plasma treatment speed can be about 10 in/sec and the cure delay can be about 1500 ms. In still another embodiment, the plasma treatment speed can be about 10 in/sec and the cure delay can be about 3000 ms. In still another embodiment, the plasma treatment speed can be about 10 in/sec and the cure delay can be about 10000 ms. In still another embodiment, the plasma treatment speed can be about 50 in/sec and the cure delay can be about 10000 ms. In still another embodiment, the plasma treatment speed can be about 25 in/sec and the cure delay can be about 5000 ms.

In general, when plasma treatment speed is increased, the cure delay time is also increased. However, extending cure delay time, absent other action, can allow the applied radiation curable material to move or migrate on the card surface which will degrade the image quality. However, pinning the radiation curable material can help hold the applied radiation curable material in place and prevent its migration, thereby reducing or eliminating the effects of a longer cure delay time.

Figure 2:
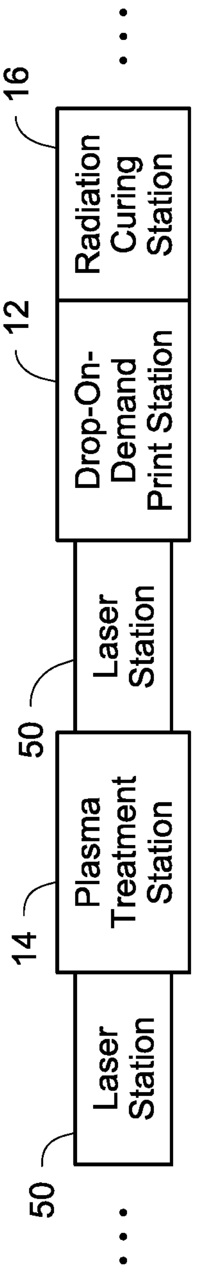

FIG. 2 illustrates another embodiment of the plastic card personalization system 10. In FIG. 2, features that are the same as features in FIG. 1 are referenced using the same reference numerals. In the system 10 in FIG. 2, a laser can be used to roughen the surface of the plastic card to increase the surface roughness of the plastic card and enhance the adhesion of the resulting printing to the card surface. For example, a laser station 50 can be provided between the plasma treatment station 14 and the DOD print station 12, where the laser station 50 includes a suitable laser, such as but not limited to a $CO_2$ laser, which emits a laser beam which can be applied to the card surface to increase its surface roughness at least in areas where the subsequent radiation curable material from the DOD printer or other downstream printing will be applied. The increased surface roughness increases the surface area to which the applied printed material can bond to, thereby increasing the adhesion of the printed material to the surface. In another embodiment, the laser station 50 can be disposed upstream of the plasma treatment station 14. In still another embodiment, a laser station can be located downstream from the radiation curing station 16 to process the card with the laser after the printed material has been cured. In still another embodiment, a laser station can be located between the DOD print station 12 and the radiation curing station 16 to process the card with the laser after the printed material has been applied to the card but prior to full curing of the radiation curable material. A suitable laser station is available from Entrust Corporation of Shakopee, Minnesota.

Figure 3:
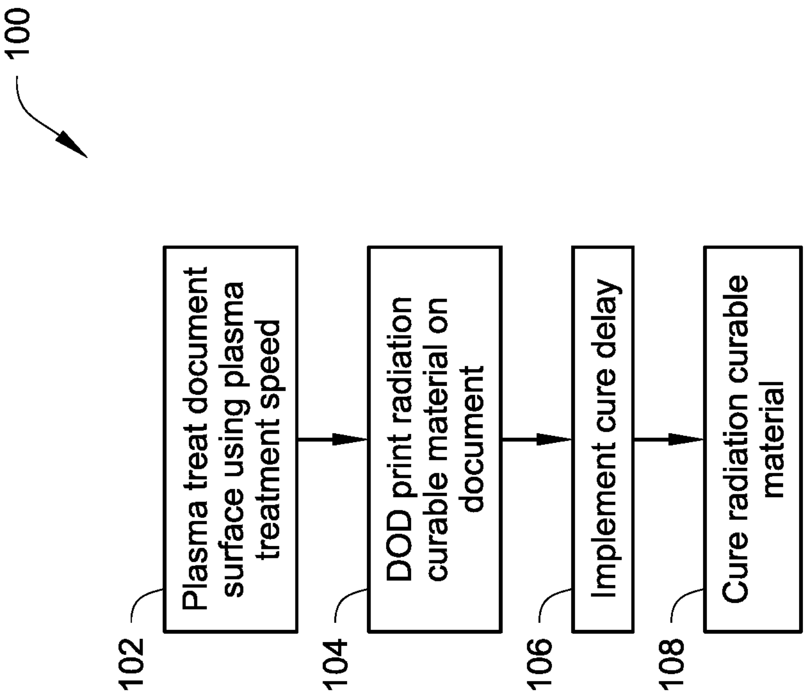
FIG. 3 illustrates a DOD printing process described herein.

FIG. 3 illustrates a DOD printing process 100 described herein. In step 102, a surface of the card is plasma treated in the plasma treatment station using a plasma treatment speed. Thereafter, in step 104, radiation curable material is printed onto the surface using the DOD print station. Once printing by the DOD print station is completed, a cure delay is implemented in step 106 in any suitable manner prior to curing the radiation curable material. The cure delay increases the dwell time of the radiation curable material on the surface prior to full curing of the radiation curable material. Thereafter, in step 108, at the completion of the cure delay, the radiation curable material is cured in the radiation curing station using suitable radiation applied by the radiation curing station. In an embodiment, a laser as described in FIG. 2 can be used to increase the surface roughness of the card prior to printing by the DOD print station.

The system 10 may be configured as a large volume batch plastic card production machine, often configured with multiple processing stations or modules, typically referred to as a central issuance system, that processes multiple plastic cards at the same time and is designed to personalize plastic cards in relatively large volumes, for example measured in the high hundreds or even thousands per hour. An example of a central issuance system is the MX or MPR-lines of central issuance systems available from Entrust Corporation of Shakopee, Minnesota Additional examples of central issuance systems are disclosed in U.S. Pat. Nos. 4,825,054, 5,266,781, 6,783,067, and 6,902,107, all of which are incorporated herein by reference in their entirety. Alternatively, the system 10 may be configured as a desktop plastic card printer that has a relatively small footprint intended to permit the desktop plastic card printer to reside on a desktop and that is designed to personalize plastic cards in relatively small volumes, for example measured in tens or low hundreds per hour. An example of a desktop plastic card printer is the CD800 Card Printer available from Entrust Corporation of Shakopee, Minnesota Additional examples of desktop printers are disclosed in U.S. Pat. Nos. 7,434,728 and 7,398,972, each of which is incorporated herein by reference in its entirety.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A card personalization system that personalizes a card, comprising:

- a drop-on-demand print station that is configured to print radiation curable material on a surface of the card to form a printed image;
- a plasma treatment station that is configured to plasma treat the surface of the card prior to printing the radiation curable material on the surface, the plasma treatment station includes a plasma treatment station card transport mechanism that transports the card within the plasma treatment station;
- a radiation curing station that is configured to emit radiation to cure the radiation curable material applied to the surface, the radiation curing station includes a radiation curing station card transport mechanism that transports the card within the radiation curing station;
- the plasma treatment station card transport mechanism is controllable independently and separately from the radiation curing station card transport mechanism;
- a controller that is connected to and configured to control the plasma treatment station card transport mechanism and the radiation curing station card transport mechanism to implement a combination of a plasma treatment speed of the plasma treatment station and a cure delay time sufficient to enhance adhesion of the printed image, wherein the plasma treatment speed is between about 10 in/sec to about 50 in/sec, and the cure delay time is between about 500 ms to about 10,000 ms.

2. The card personalization system of claim 1, wherein the plasma treatment speed is between about 10 in/sec to about 25 in/sec, and the cure delay time is between about 1500 ms to about 3000 ms.

3. The card personalization system of claim 1, wherein the plasma treatment speed is about 10 in/sec, and the cure delay time is about 1500 ms.

4. The card personalization system of claim 1, wherein the card is a polycarbonate card or a polyester card.

5. The card personalization system of claim 1, wherein the drop-on-demand print station includes a drop-on-demand print station card transport mechanism that transports the card within the drop-on-demand print station; and the drop-on-demand print station card transport mechanism is controllable separately from the plasma treatment station card transport mechanism and the radiation curing station card transport mechanism.

6. The card personalization system of claim 1, further comprising a laser station that includes a laser.

7. A method of processing a card in a card personalization system, comprising:

- inputting the card into a plasma treatment station of the card personalization system, and plasma treating the card in the plasma treatment station, the plasma treatment station includes a plasma treatment station card transport mechanism that transports the card within the plasma treatment station;
- thereafter inputting the card into a drop-on-demand print station and printing radiation curable material on a surface of the card to form a printed image;
- thereafter inputting the card into a radiation curing station applying radiation to the radiation curable material to cure the radiation curable material applied to the surface, the radiation curing station includes a radiation curing station card transport mechanism that transports the card within the radiation curing station, and the plasma treatment station card transport mechanism is controllable independently and separately from the radiation curing station card transport mechanism; and
- independently and separately controlling the plasma treatment station card transport mechanism and the radiation curing station card transport mechanism to implement a combination of a plasma treatment speed of the plasma treatment station and a cure delay time after the radiation curable material is applied to the surface of the card sufficient to enhance adhesion of the printed image to the surface of the card, wherein the plasma treatment is controlled so that the plasma treatment speed is between about 10 in/sec to about 50 in/sec, and the cure delay time is controlled so that the cure delay time is between about 500 ms to about 10,000 ms.

8. The method of claim 7, further comprising controlling the plasma treatment speed so that the plasma treatment speed is between about 10 in/sec to about 25 in/sec, and controlling the cure delay time so that the cure delay time is between about 1500 ms to about 3000 ms.

9. The method of claim 7, further comprising controlling the plasma treatment speed so that the plasma treatment speed is about 10 in/sec, and controlling the cure delay time so that the cure delay time is about 1500 ms.

10. The method of claim 7, wherein the card is a polycarbonate card or a polyester card.

11. The method of claim 7, wherein the drop-on-demand print station includes a drop-on-demand print station card transport mechanism that transports the card within the drop-on-demand print station, the drop-on-demand print station card transport mechanism is controllable separately from the plasma treatment station card transport mechanism and the radiation curing station card transport mechanism; and comprising separately controlling the drop-on-demand print station card transport mechanism from the plasma treatment station card transport mechanism and the radiation curing station card transport mechanism.

12. The method of claim 7, further comprising using a laser of a laser station to process a surface of the card.

* * * * *